(12) United States Patent
Houser

(10) Patent No.: US 12,722,503 B2
(45) Date of Patent: Sep. 1, 2026

(54) DYNAMIC MOTOR CONTROL FOR OPTIMIZING POWERTRAIN EFFICIENCY

(71) Applicant: PACCAR Inc, Bellevue, WA (US)

(72) Inventor: Jordan Michael Houser, Lewisville, TX (US)

(73) Assignee: PACCAR Inc, Bellevue, WA (US)

( * ) Notice: Subject to any disclaimer, the term of this patent is extended or adjusted under 35 U.S.C. 154(b) by 270 days.

(21) Appl. No.: 18/356,681

(22) Filed: Jul. 21, 2023

(65) Prior Publication Data

US 2025/0026205 A1 Jan. 23, 2025

(51) Int. Cl.
*B60L 15/20* (2006.01)
*B60K 1/00* (2006.01)
*B60K 1/02* (2006.01)

(52) U.S. Cl.
CPC ............ *B60L 15/2045* (2013.01); *B60K 1/02* (2013.01); *B60K 2001/001* (2013.01); *B60L 2240/423* (2013.01)

(58) Field of Classification Search
None
See application file for complete search history.

(56) References Cited

U.S. PATENT DOCUMENTS 7,739,005 B1 * 6/2010 Tang ........................ B60L 3/10 701/69
12,103,512 B2 * 10/2024 Weston ............ B60W 30/1882
2014/0343770 A1 * 11/2014 Sponheimer ........ B60L 15/2036 701/22
2022/0379872 A1 * 12/2022 Morton ................ B60W 10/26

FOREIGN PATENT DOCUMENTS

CN 107117074 A 9/2017
CN 111987960 A 11/2020

OTHER PUBLICATIONS

Elgbaily et al. "A Combined Control Scheme of Direct Torque Control and Field-Oriented Control Algorithms for Three-Phase Induction Motor: Experimental Validation." Mathematics, vol. 10, 2022. pp. 1-33.

(Continued)

*Primary Examiner* — James J Lee
*Assistant Examiner* — David Hatch

(57) ABSTRACT

The present disclosure relates to systems and methods of dynamically modulating use of various motor control strategies (MCSs) to optimize powertrain efficiency. One or a combination of MCSs are strategically and dynamically implemented to regulate torque to drive axle motors based on vehicle operating conditions. In normal acceleration conditions, Field-Oriented Control (FOC) may regulate torque applied to a first drive axle motor and Direct Torque Control (DTC) may regulate torque applied to a second drive axle motor, where the first drive axle motor may operate at peak efficiency and the second drive axle motor may compensate for fluctuating torque demand. In cruising speed conditions, FOC may regulate torque applied to both the first and second drive axle motors to operate with high steady-state efficiency.

12 Claims, 7 Drawing Sheets

(56) References Cited

OTHER PUBLICATIONS

Kronberg et al. "Design and Simulation of Field Oriented Control and Direct Torque Control for a Permanent Magnet Synchronous Motor with Positive Saliency." www.teknat.uu.se/student, pp. 1-63.
Extended European Search Report for European Patent Application No. 24188983.1 mailed Dec. 12, 2024, 11 pages.
Buchholz, O. et al., "FPGA-Based Dynamically Reconfigurable Control of Induction Motor Drives", 39th Annual Conference of the IEEE Industrial Electronics Society, IEEE, pp. 3543-3548, Nov. 10, 2013.
De Klerk, M. et al., "A Comprehensive Review of Advanced Traction Motor Control Techniques Suitable for Electric Vehicle Applications", IEEE Access, vol. 9, pp. 125080-125108, Sep. 6, 2021.
Farasat, M. et al., "Speed Sensorless Electric Vehicle Propulsion System Using Hybrid FOD-DTC Induction Motor Drive", 2011 International Conference on Electrical Machines and Systems, IEEE, pp. 1-5, Aug. 20, 2011.
Poorfakhraei, A. et al., "A Review of Modulation and Control Techniques for Multilevel Inverters in Traction Applications", IEEE Access, vol. 9, pp. 24187-24204, Feb. 3, 2021.

* cited by examiner

DYNAMIC MOTOR CONTROL FOR OPTIMIZING POWERTRAIN EFFICIENCY

BACKGROUND

Enhanced powertrain efficiency can have various positive impacts on the lifespan and operation of a vehicle's powertrain. In addition to lowering consumption of fuel or energy usage, a more efficiently operating powertrain may also experience less strain and stress that may be associated with mechanical issues and/or a shorter lifespan.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This disclosure generally relates to providing dynamic motor control for optimizing powertrain efficiency. In examples, one or a combination of motor control strategies are strategically and dynamically implemented in a drive axle to optimize benefits of various motor control strategies in different vehicle operating conditions. In some examples, such as when normal acceleration conditions are observed, Field-Oriented Control (FOC) is used to regulate torque applied to a first drive axle (e.g., a forward drive axle) and Direct Torque Control (DTC) is used to regulate torque applied to a second drive axle (e.g., a rear drive axle). For instance, the first drive axle may operate more efficiently, and the second drive axle may make up for fluctuating torque demand. In other examples, such as when cruising speed conditions are observed and when vehicle operating conditions may be less dynamic, FOC may be used to regulate torque applied to both the first and second drive axles. For instance, the first and second drive axles may operate with high steady-state efficiency at cruising speeds. In further examples, such as when above-average (e.g., hard) acceleration conditions are observed, DTC may be used to regulate torque applied to both the first and second drive axles. For instance, a fast torque response may be provided to both the first and second drive axles to meet hard acceleration demands.

According to an example implementation, a method for providing dynamic motor control is described, comprising: determining a total torque demand to a powertrain system of a vehicle; determining a torque distribution of the total torque demand between a first drive axle motor and a second drive axle motor of the powertrain system; determining a motor control mode; generating torque references for the first and second drive axle motors based on the determined torque distribution using one or a combination of motor control strategies corresponding to the determined motor control mode; and transmitting the torque references to the first and second drive axle motors to achieve the determined torque distribution.

According to another example implementation, a system for providing dynamic motor control of a vehicle is described, comprising: at least one processor; and memory storing instructions that, when executed by the processor, cause the system to: receive sensor input associated with a powertrain system of the vehicle; determine a total torque demand based on the sensor input; determine a torque distribution of the total torque demand between a first drive axle motor and a second drive axle motor of the powertrain system based on the sensor input; determine a motor control mode based on the sensor input; generate torque references for the first and second drive axle motors based on the determined torque distribution using one or a combination of motor control strategies corresponding to the determined motor control mode; and transmit the torque references to the first and second drive axle motors to achieve the determined torque distribution.

According to another example implementation, a powertrain controller for a vehicle including a tandem drive axle, comprising: at least one processor; and memory storing instructions that, when executed by the at least one processor, cause the powertrain controller to: receive sensor input associated with a powertrain system of the vehicle; determine a total torque demand based on the sensor input; determine a torque distribution of the total torque demand between a first drive axle motor and a second drive axle motor of the powertrain system based on the sensor input; determine a motor control mode of a plurality of motor control modes based on the sensor input, where each motor control mode corresponds to using one or a combination of motor control strategies; generate torque references for the first and second drive axle motors based on the determined torque distribution using the one or a combination of motor control strategies corresponding to the determined motor control mode; and transmit the torque references to the first and second drive axle motors to achieve the determined torque distribution.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1A:
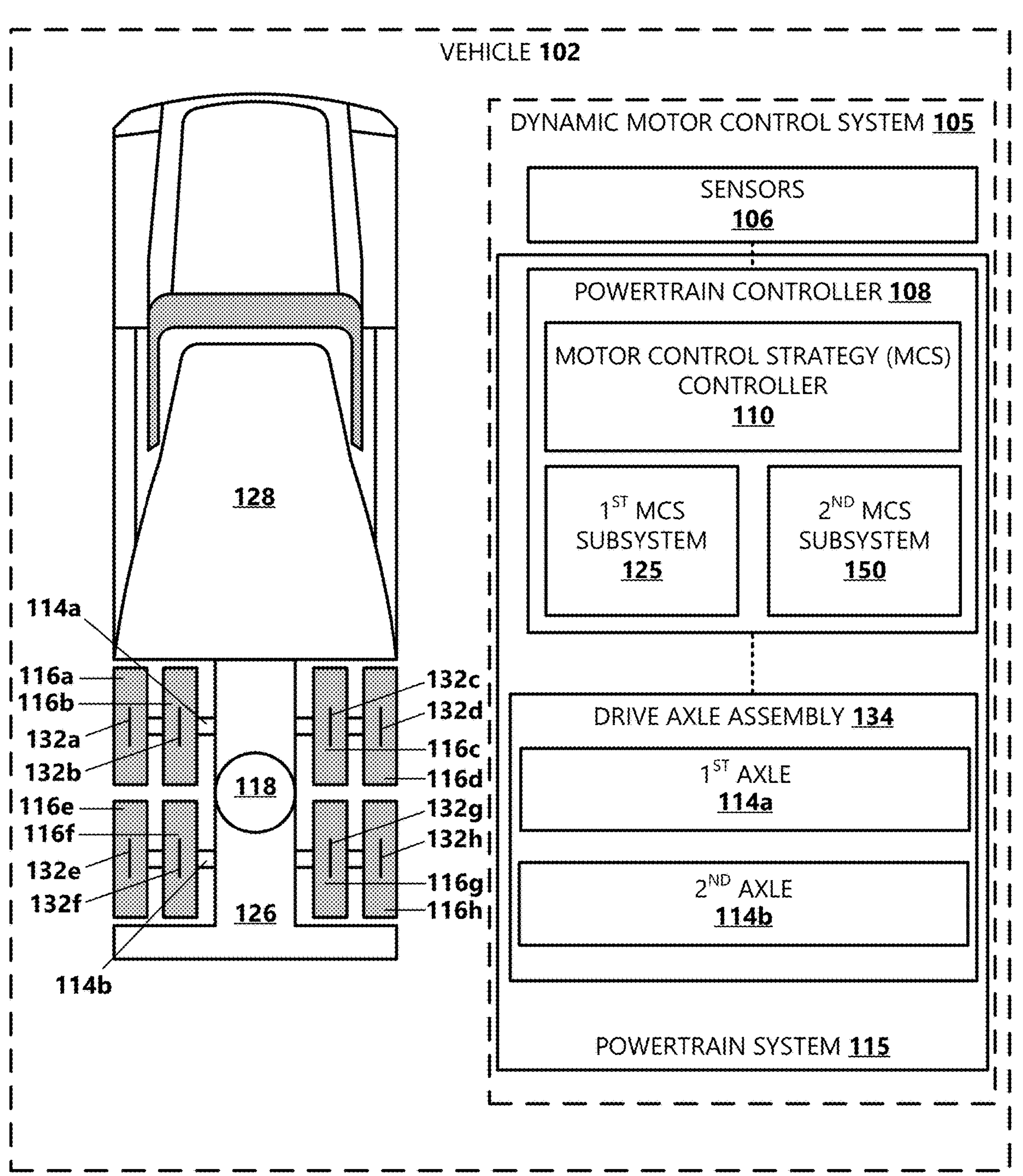
FIG. 1A is a conceptual illustration of a vehicle in which a dynamic motor control system may be implemented according to examples.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

The present disclosure relates to systems and methods of dynamically modulating use of a combination of motor control strategies to optimize powertrain efficiency. In addition to lowering consumption of fuel or energy usage, a more efficiently operating powertrain may further experience less strain and stress that may be associated with mechanical issues and/or a shorter lifespan of the vehicle. Thus, by optimizing particular motor control strategies during particular vehicle operating conditions, powertrain efficiency may be increased, and components of the powertrain may experience fewer mechanical issues and lower service requirements, resulting in decreased service costs over the lifespan of the vehicle. These and other examples are discussed below with reference to FIGS. 1-6.

Figure 1B:
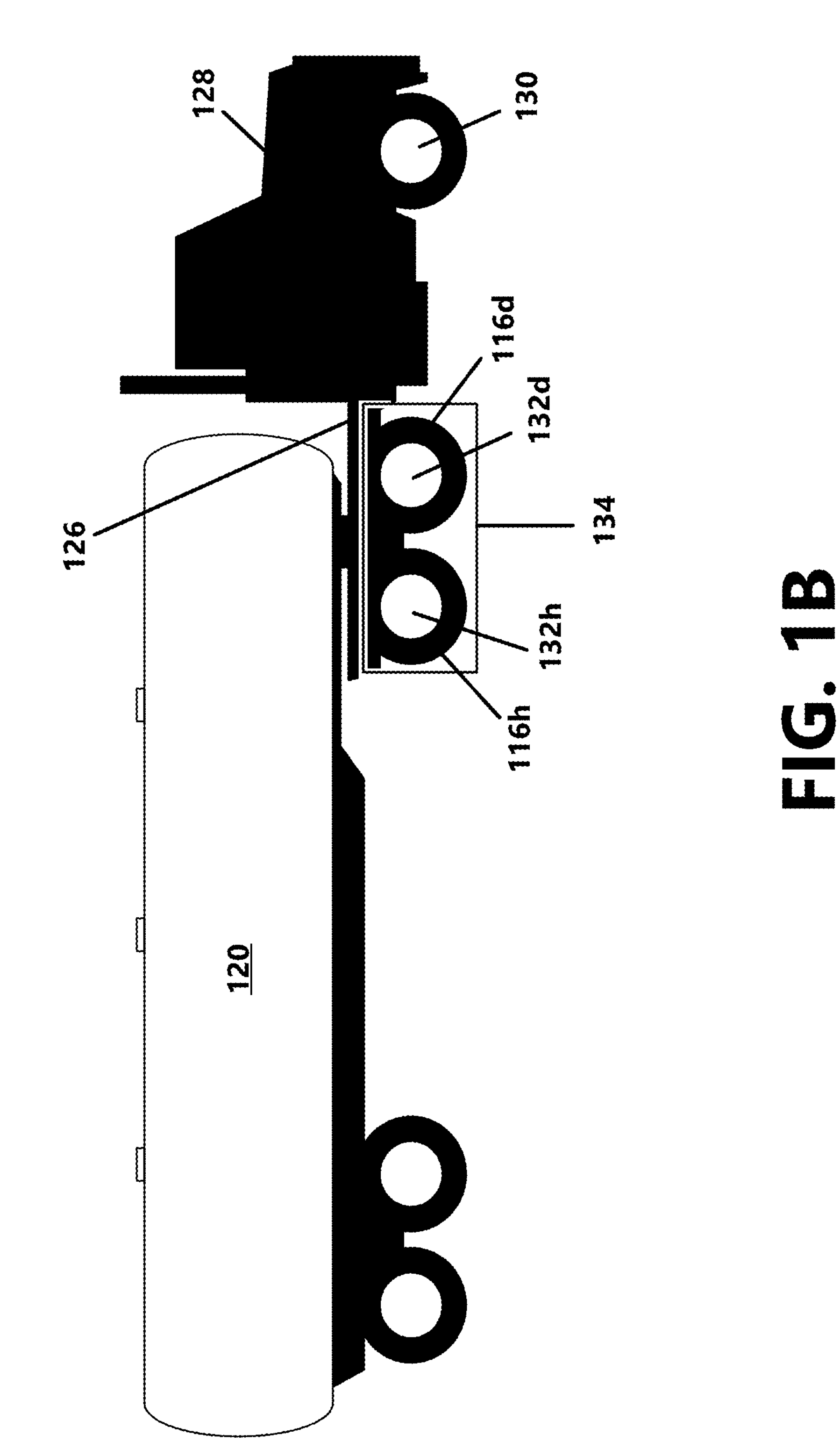
FIG. 1B is a side view of the vehicle of FIG. 1A in which the dynamic motor control system may be implemented according to examples.

FIG. 1A illustrates a conceptual top view and a schematic diagram of a vehicle 102 and FIG. 1B illustrates a conceptual side view of the vehicle 102, where the vehicle 102 employs an example dynamic motor control system 105. According to example implementation, the dynamic motor control system 105 includes various sensors 106, a powertrain controller 108 including or in communication with a dynamic motor control strategy (MCS) controller 110, and a drive axle assembly 134 of the vehicle's powertrain system 115. In some implementations, the vehicle 102 is a truck, such as a Class 8 truck. However, the methods and systems can be used by vehicles 102 of different types and/or sizes. For instance, aspects of the disclosed subject matter may have wide application and, therefore, may be suitable for use with other types of vehicles, such as passenger vehicles, buses, light, medium, and heavy-duty vehicles, motor homes, etc. Accordingly, the following descriptions and illustrations herein should be considered illustrative in nature and, thus, not limiting of the scope of the claimed subject matter. The vehicle 102 includes a cab 128 mounted to a chassis 126 supported by wheels 130 of a front wheel assembly and driving wheels 132_a_-132_h_ (collectively, wheels 132) of a rear wheel assembly. In some examples, the vehicle 102 is articulatedly connected to a trailer 120 by a trailer coupling 118, such as, for example, a "fifth wheel", to form a tractor-trailer combination as depicted in FIG. 1B.

In some examples, the vehicle 102 has a 6×4 configuration, where the rear wheel assembly of the drive axle assembly 134 is a tandem drive axle assembly, and both a first drive axle 114_a_ and a second drive axle 114_b_ (collectively, drive axles 114) of the rear wheel assembly are drive axles (tandem drive axles) that are powered to propel the vehicle 102. Although various examples are depicted and discussed as including two drive axles 114, in other examples, the drive axle assembly 134 may include additional drive axles or a single drive axle. In examples, the one or more drive axles 114 are each coupled to one or two pairs of wheels 132. For instance, a first set of wheels 132_a_-132_b_ may be coupled to a left side of the first drive axle 114_a_ and a second set of wheels 132_c_-132_d_ may be coupled to a right side of the first drive axle 114_a_. Additionally, a third set of wheels 132_e_-132_f_ may be coupled to a left side of the second drive axle 114_b_ and a fourth set of wheels 132_g_-132_h_ may be coupled to a right side of the second drive axle 114_b_. A drive tire 116_a_-116_h_ (collectively, tire 116) is mounted onto each wheel 132. For instance, a first set of tires 116_a_-116_b_ are mounted on the first set of wheels 132_a_-132_b_, a second set of tires 116_c_-116_d_ are mounted on the second set of wheels 132_e_-132_f_, a third set of wheels 132_e_-132_f_ are mounted on the third set of wheels 132_e_-132_f_, and a fourth set of tires 116_g_-116_h_ are mounted on the fourth set of wheels 132_g_-132_h_. Although the drive axle assembly 134 is depicted in FIG. 1B as having a particular position in the vehicle 102 and the drive axles 114 are depicted as having a particular position in the drive axle assembly 134, it should be understood that the drive axles 114 can be located in a variety of positions within the vehicle 102.

In examples, the sensors 106 include an accelerator pedal position sensor (APPS), speed sensors, torque sensors, a throttle position sensor, load sensors, temperature sensors, and other sensors 106 operative to collect data associated with the powertrain system 115 and corresponding to various vehicle operating conditions.

The powertrain controller 108 is a control module that performs control functions for components of the vehicle's powertrain system 115 (e.g., the engine, transmission, emissions system, hybrid, or electric drivetrain components, such as the drive axle assembly 134). In examples, the powertrain controller 108 receives inputs corresponding to driver (or autonomous driving) commands (e.g., accelerator pedal requests, autonomous driving requests, etc.), speed, torque, and other signals associated with the powertrain system 115 (e.g., sensor and/or vehicle systems, such as automated braking, and stability control), processes the inputs, and determines a total torque demand and distribution of the total torque demand between each drive axle 114 or drive axle motor corresponding to one or more control objectives. An example control objective includes optimizing MCSs to achieve a desired performance of the powertrain system 115 while minimizing energy losses.

The powertrain controller 108 may strategically utilize one or a combination of MCS subsystems (e.g., a first MCS subsystem 125 and/or a second MCS subsystem 150). The MCS subsystems may use an MCS to generate torque references representing target torque levels for each drive axle motor to achieve the desired torque distribution. In an example implementation, the first MCS subsystem 125 uses a first MCS, such as direct torque control (DTC), and the second MCS subsystem 150 uses a second MCS, such as field-oriented control (FOC). In other examples, the powertrain controller 108 may include additional and/or alternative MCS subsystems that use additional and/or alternative MCSs to derive torque references for the motors of the drive axles 114. For instance, although two MCS subsystems are shown, more than two MCS subsystems are possible, where each motor included in a drive axle 114 may be controlled individually according to each of the 2-N MCS subsystems.

In examples, the powertrain controller 108 uses the MCS controller 110 to determine which MCS subsystem(s) to utilize for generating torque references for each drive axle 114 of the drive axle assembly 134 based on vehicle operating conditions for optimizing powertrain efficiency. For instance, each MCS that the powertrain controller 108 is configured with may have different benefits that can be optimized in different vehicle operating conditions. Based on determinations made by the MCS controller 110, the powertrain controller 108 may use the first MCS subsystem 125 to generate torque references for at least one drive axle motor (e.g., of one or more drive axles 114). In other examples, the powertrain controller 108 may use the second MCS subsystem 150 to generate torque references for at least one drive axle motor (e.g., of one or more drive axles 114). As an example, when the drive axle assembly 134 includes more than two drive axles 114, torque references may be generated using the first MCS subsystem 125 for two or more of the drive axles 114, while torque references for another drive axle may be generated using the second MCS subsystem 150 (or another combination of MCS subsystems). As another example, individual motors of each drive axle 114 may be individually controlled by different combinations of MCSs. The MCS controller 110 and example MCSs that may be utilized for generating torque references for achieving a desired torque distribution between drive axle motors are described in further detail below.

Figure 2:
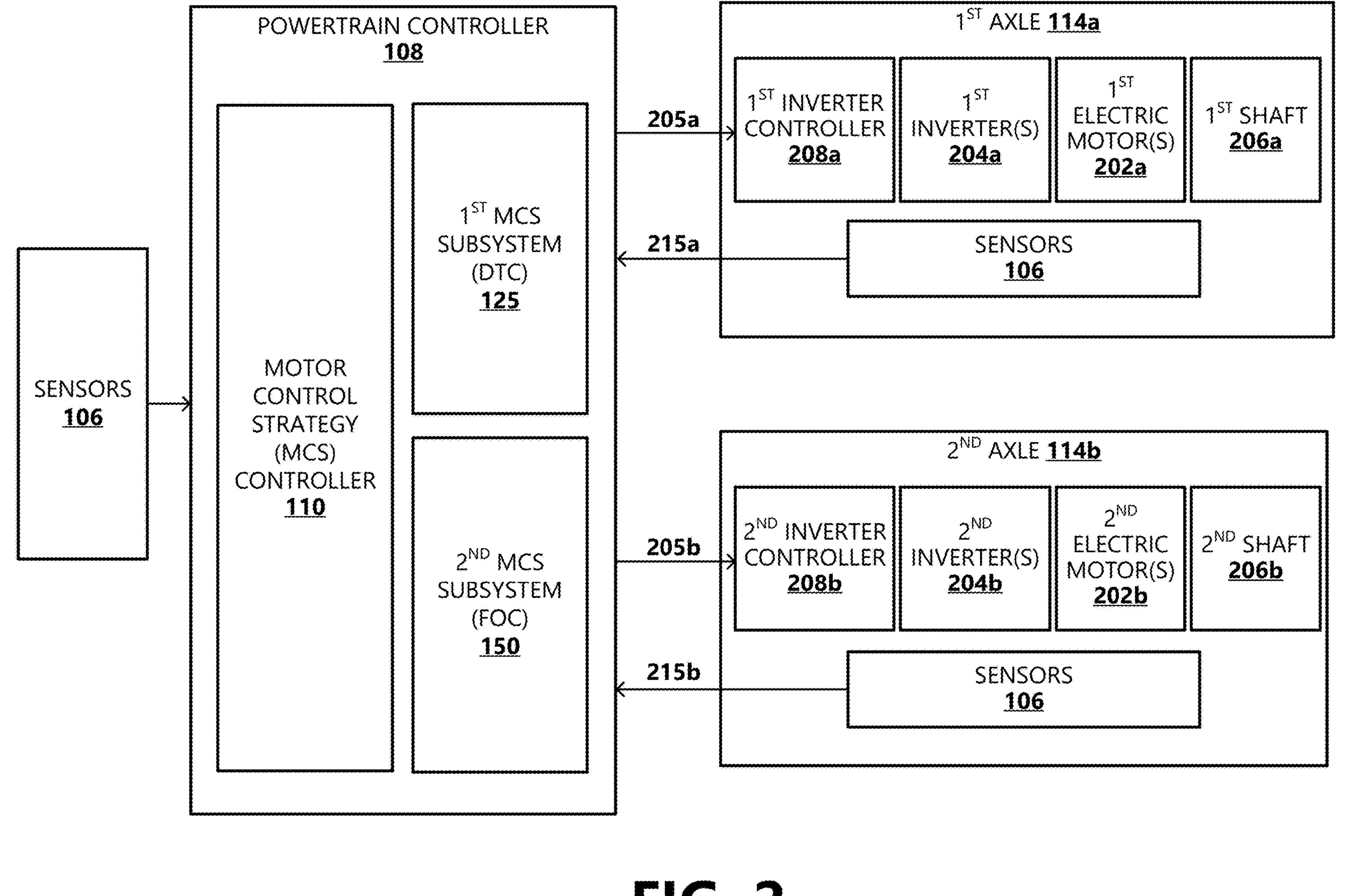
FIG. 2 is a block diagram depicting a flow of data between components of the dynamic motor control system for providing dynamic motor control according to examples.

With reference now to FIG. 2, a diagram is illustrated of an example data flow between components of the dynamic motor control system 105 for providing dynamic MCS optimization. Although various examples are discussed in relation to FIG. 2 with a vehicle 102 having one motor per drive axle and two drive axles (e.g., a first drive axle 114*a* and a second drive axle 114*b*), the powertrain controller 108 may be used to provide control on a per-motor basis (with a different MCS subsystem used to control different motors on the same drive axle 114, different motors on different drive axles 114, or any combination thereof). According to an example implementation, the first drive axle 114*a* and the second drive axle 114*b* are electronic drive axles (e-axles) that have at least one electric motor 202*a* and 202*b* (collectively, electric motor 202) integrated in or connected to the drive axles that transmits torque to the wheels 132 to propel the vehicle 102 forward or backward. In examples, the each electric motor 202 is connected to a an inverter 204*a* and 204*b* (collectively, inverter 204) that converts DC power from a battery or other power source into three-phase AC power. For instance, a first inverter 204*a* may control the amplitude, frequency, and waveform of the AC power supplied to a first electric motor 202*a* and a second inverter 204*b* may control the amplitude, frequency, and waveform of the AC power supplied to a second electric motor 202*b* based on torque commands 205*a* and 205*b* (collectively, torque commands 205) received from the powertrain controller 108. Each inverter 204 may include or be connected to an inverter controller 208*a* and 208*b* (collectively, inverter controller 208). For example and as depicted, a first inverter controller 208*a* is integrated with or connected to the first inverter 204*a* that receives first torque commands 205*a* from the powertrain controller 108 and regulates operation of the first inverter 204*a* based on torque references included in the first torque commands 205*a*. In some examples, a second inverter controller 208*b* is integrated with or connected to the second inverter 204*b* that receives second torque commands 205*b* from the powertrain controller 108 and regulates operation of the second inverter 204*b* based on torque references included in the second torque commands 205*b*. In some examples, the inverter controller(s) 208 control the switching of power devices in the inverter(s) 204, such as IGBTs (Insulated Gate Bipolar Transistors), MOSFETs (Metal-Oxide-Semiconductor Field-Effect Transistors), etc., based on the torque references to control the voltage and current supplied to the electric motor(s) 202.

Each electric motor 202 may be interconnected with a shaft 206*a* and 206*b* (collectively, shaft 206) via a gearbox (transmission) and a differential. The first electric motor 202 converts electrical energy from the first inverter 204 into mechanical energy. The first electric motor 202 may be connected to the gearbox (transmission), which may adjust the torque and speed from the first electric motor 202 before transmitting it to the differential. The differential may distribute torque between the connected wheels 132 while allowing them to rotate at different speeds. In examples, a first shaft 206*a* and a second shaft 206*b* connect and transmit rotational force (from the differential) to the wheels 132 to propel the vehicle 102. In other examples, the electric motor 202 and gearbox (transmission) may be integrated into a single unit (e.g., a transaxle), where the power may be transmitted directly to the shafts 206. In further examples, other components are used, and the power is transmitted through a combination of gears, shafts, and other mechanical linkages.

In further examples, each drive axle 114 may include an electric motor 202 operatively connected to a side of the drive axle 114 such that torque may be controlled separately (e.g., to each side of the first drive axle 114*a* and second drive axle 114*b*). In yet further examples, the vehicle 102 may have additional drive axles 114 (e.g., a third, fourth, or Nth drive axle) that include at least one electric motor, similar to electric motor 202. In still yet further examples, each drive axle 114 of the vehicle 102 may have multiple electric motors (and associated inverter(s)). For instance, one or more of the drive axles 114 in the powertrain system 115 may include two or more electric motors. In some instances, in a tandem drive axle configuration, one or more drive axles 114 may include multiple electric motor(s) 202, respectively. Similarly, in a tridem (or greater) drive axle configuration, each drive axle 114 may have 1 to N electric motor(s) and associated inverter(s).

The drive axles 114 may further include various sensors 106 that provide feedback 215*a* and 215*b* (collectively, feedback 215) to the powertrain controller 108 for maintaining desired performance. The sensors 106 may include one or more torque sensors that measure the torque output of the electric motor 202 and/or the torque being transmitted through the drivetrains. For instance, torque sensors may be located at electric motor shafts, gearbox output shafts, and/or the shafts 206. In some examples, the sensors 106 may include speed sensors that measure the rotational speed or angular velocity of the electric motor shafts and/or the shafts 206. For instance, speed sensors may be located at the electric motor shafts, the gearbox input and/or output shafts, at wheel hubs, etc. In further examples, the sensors 106 may include current sensors to provide information about the current of the electric motors 202. The sensors 106 may provide real-time feedback 215 to the powertrain controller 108, which the first 125 and/or second MCS subsystems 250 may utilize to adjust torque references to optimize performance and efficiency of the powertrain system 115.

The powertrain controller 108 may monitor sensor inputs, such as accelerator pedal requests corresponding to a position of the accelerator pedal. In examples, the accelerator pedal requests are translated into total torque demands for the drive axle assembly 134 using a pedal map. In an autonomous driving scenario, the powertrain controller 108 may receive a total torque demand directly from an autonomous driving controller. The powertrain controller 108 may further determine a distribution of the total torque demands between a first drive axle and a second drive axle. In examples, the torque distribution may be increased or decreased based on signals from various sensors 106 and/or vehicle systems. In some examples, the torque distribution may be adjusted based on determinations made by the MCS controller 110.

The MCS controller 110 may monitor vehicle operating conditions based on inputs and feedback 215 from various sensors 106 and determine a motor control mode to implement that optimizes efficiency of the powertrain system 115. The motor control mode may be one of a plurality of motor control modes, where each motor control mode may correspond to utilizing one or a combination of MCSs (e.g., DTC and/or FOC) for generating torque references. Each motor control mode may exploit advantages of the MCSs based on current vehicle operating conditions. Example first, second, and third motor control modes are described below. Other motor control modes are possible and are within the scope of the present disclosure.

In an example where the first MCS is implemented as DTC, torque references generated by the first MCS subsystem 125 and included in torque commands 205 may be derived via a predictive control strategy. In DTC, torque and flux reference values that control the torque and magnetic flux of the electric motor 202 may be calculated based on a desired motor torque and motor flux (e.g., according to the motor's characteristics and system constraints), and hysteresis comparators may be utilized to continuously compare actual torque and flux with the calculated reference values. These comparators may determine the switching states of the first and/or second inverters' power switching devices (e.g., the IGBTs or MOSFETs) based on error signals representing the differences. The switching states determine the timing and duration of the current flow, which directly affects the torque and flux output of the electric motor 202. In DTC, the first MCS subsystem 125 may further utilize look-up tables or mathematical models to determine optimum voltage vectors (e.g., switching patterns) for a control period. The look-up tables may provide information on the appropriate voltage vectors based on sensor feedback 215 representing current vehicle operating conditions, such as speed, torque, and flux levels (e.g., of the electric motors 202).

In examples, DTC may offer various advantages, such as a fast torque response due to its direct control approach. By directly controlling the torque and flux, the powertrain controller 108 can quickly adjust the first and/or second electric motor's behavior and respond to changes in torque demand. This may provide improved acceleration, deceleration, and overall dynamic performance of the vehicle 102. Additionally, the first MCS subsystem 125 may be simplified compared to the second MCS subsystem 150 (e.g., or other MCS subsystems). For instance, DTC avoids utilizing coordinate transformations and complex mathematical calculations involved in FOC (e.g., the second MCS).

While DTC offers several advantages, in certain vehicle operating conditions, DTC may not be advantageous for optimizing powertrain efficiency. For example, DTC can experience high torque and current ripple at low motor speeds. The first MCS subsystem 125 may rely on the measurement and comparison of the drive axle motor's flux and torque, which can be challenging at low speeds. The fluctuations in torque and current can lead to decreased smoothness and increased acoustic noise in operation of the electric motor 202. In some examples, DTC may have limited control capability when the electric motor 202 is operating at or near standstill. The first MCS subsystem 125 may rely on motor feedback and accurate estimation of motor parameters, which can be difficult when the motor is not rotating or rotating very slowly. As a result, precise torque and speed control using DTC at standstill conditions may be challenging.

In an example where the second MCS is implemented as FOC, torque references generated by the second MCS subsystem 150 and included in torque commands 205 may separately control a flux component and a torque component of the electric motor's stator currents. In examples, the second MCS subsystem 150 may apply a coordinate transformation (e.g., the Clarke and Park transformation) that converts stator current components from a stationary reference frame to a rotating reference frame that aligns with rotor flux. In a transformed (rotating) reference frame, a torque-producing current component (q-axis current) may be perpendicular to the rotor flux, and the flux-producing current component (e.g., d-axis current) may be aligned with the rotor flux. Thus, control of torque and flux may be decoupled and controlled independently. In examples, regulating and adjusting the torque component and the flux component separately may result in more precise control of torque and better optimization of motor performance.

In some examples, the second MCS subsystem 150 may use various control techniques, such as proportional-integral (PI) controllers, to regulate the d-axis and q-axis currents and adjust the torque reference values sent to the inverter 204. For instance, this may ensure that the actual motor currents closely follow the reference values. By accurately controlling the motor currents, FOC may provide high torque accuracy across all operating speeds. In examples, in FOC, the electric motor 202 may operate in a field-oriented manner, meaning that the rotor flux remains aligned with the d-axis component of the stator current, which maximizes the torque-producing capability of the motor and increases torque accuracy and efficiency.

While FOC offers various advantages, in certain vehicle operating conditions, FOC may not be advantageous for optimizing powertrain efficiency. For instance, FOC typically involves complex control algorithms and calculations, which can result in slower response times compared to other MCSs, such as DTC. The transformation, coordination, and control computations required in FOC may introduce additional processing delays, which may lead to slower motor response to changes in torque commands. This limitation may be more prominent in applications that require very fast and dynamic responses.

Inputs and feedback 215 associated with the powertrain system 115 may be received from various sensors 106 and vehicle systems. This sensor input may be used to determine various vehicle operating conditions. Based on vehicle operating conditions, the MCS controller 110 may determine a motor control mode to implement to optimize efficiency of the powertrain system 115. In some examples, in determining vehicle operating conditions, a determination may be made regarding acceleration conditions. For instance, the MCS controller 110 may determine that vehicle operating conditions indicate normal acceleration conditions when a total torque demand corresponding to an accelerator pedal request is within a normal acceleration threshold range. In some examples, the normal acceleration threshold range can be specific to a type of vehicle, a driver profile, a fleet of vehicles, or a variety of other parameters. In some examples, the determination of motor control mode may be made based on a rate of change of the torque demand. In some examples, normal acceleration conditions are further determined based on input from one or more other additional and/or alternative sensors 106, such as signals associated with yaw rate, lateral acceleration, and/or wheel slip (e.g., to assess dynamic behavior of the vehicle 102).

In some examples, when normal acceleration conditions are determined, the MCS controller 110 may select to implement the first motor control mode. In the first motor control mode, the powertrain controller 108 may use the second MCS subsystem 150 to generate torque references corresponding to a desired distribution of the total torque demand for the first drive axle 114*a*. For instance, the first drive axle 114*a* (e.g., the front drive axle of the drive axle assembly 134) may receive torque commands 205 including torque references generated using the FOC MCS (e.g., generated by the second MCS subsystem 150). In the first motor control mode, a peak efficiency point of the first drive axle 114*a* may be determined. For instance, the peak efficiency point may correspond to a torque-speed curve representing a relationship between the torque output and rotational speed of the first electric motor 202 across its operating range. In examples, the peak efficiency point on the torque-speed curve may be a specific combination of torque and speed at which the first drive axle 114*a* operates with the highest level of efficiency (e.g., delivers the highest level of mechanical output power while minimizing energy losses). In some examples, the torque distribution between the first drive axle 114*a* and the second drive axle 114*b* may be adjusted so that the torque distribution for the first drive axle 114*a* may correspond to the peak efficiency point of the first drive axle 114*a*. Additionally, the second MCS subsystem 150 may use FOC to generate torque references based on the adjusted torque demand, where the torque references may cause the first electric motor 202*a* to regulate its torque and flux by controlling the field orientation to provide a desired target torque level and achieve a desired torque distribution determined for the first drive axle 114*a*. For example, the desired torque distribution for the first drive axle 114*a* may be within or near a peak efficiency point range, thereby maximizing the overall efficiency and performance of the first drive axle 114*a*.

Additionally, in the first motor control mode, the powertrain controller 108 may use the first MCS subsystem 125 to determine torque references for the second drive axle 114*b*. For instance, the second drive axle 114*b* (e.g., the rear drive axle of the drive axle assembly 134) may receive torque commands 205 including a torque distribution for the second drive axle 114*b* represented as torque references generated using DTC. In examples, when the torque distribution to the first drive axle 114*a* is adjusted to correspond to its peak efficiency point, the torque distribution to the second drive axle 114*b* may be adjusted so that the torque distribution for the second drive axle 114*b* may correspond to a difference between the total torque demand and the torque distribution for the first drive axle 114*a*. The first MCS subsystem 125 may generate torque references based on the torque distribution for the second drive axle 114*b*. The torque references generated by the first MCS subsystem 125 may cause the second drive axle 114*b* to modulate its torque output to make up for an amount of the total torque demand that is not distributed to the first drive axle 114*a* so that the first drive axle 114*a* can operate at or close to its peak efficiency point. Thus, the torque output of the second drive axle 114*b* is modulated to correspond to dynamic fluctuations in total torque demand. For instance, a fluctuation may be caused by hitting a pothole on a road surface, letting up on the accelerator pedal when approaching an intersection, etc.

Figure 3:
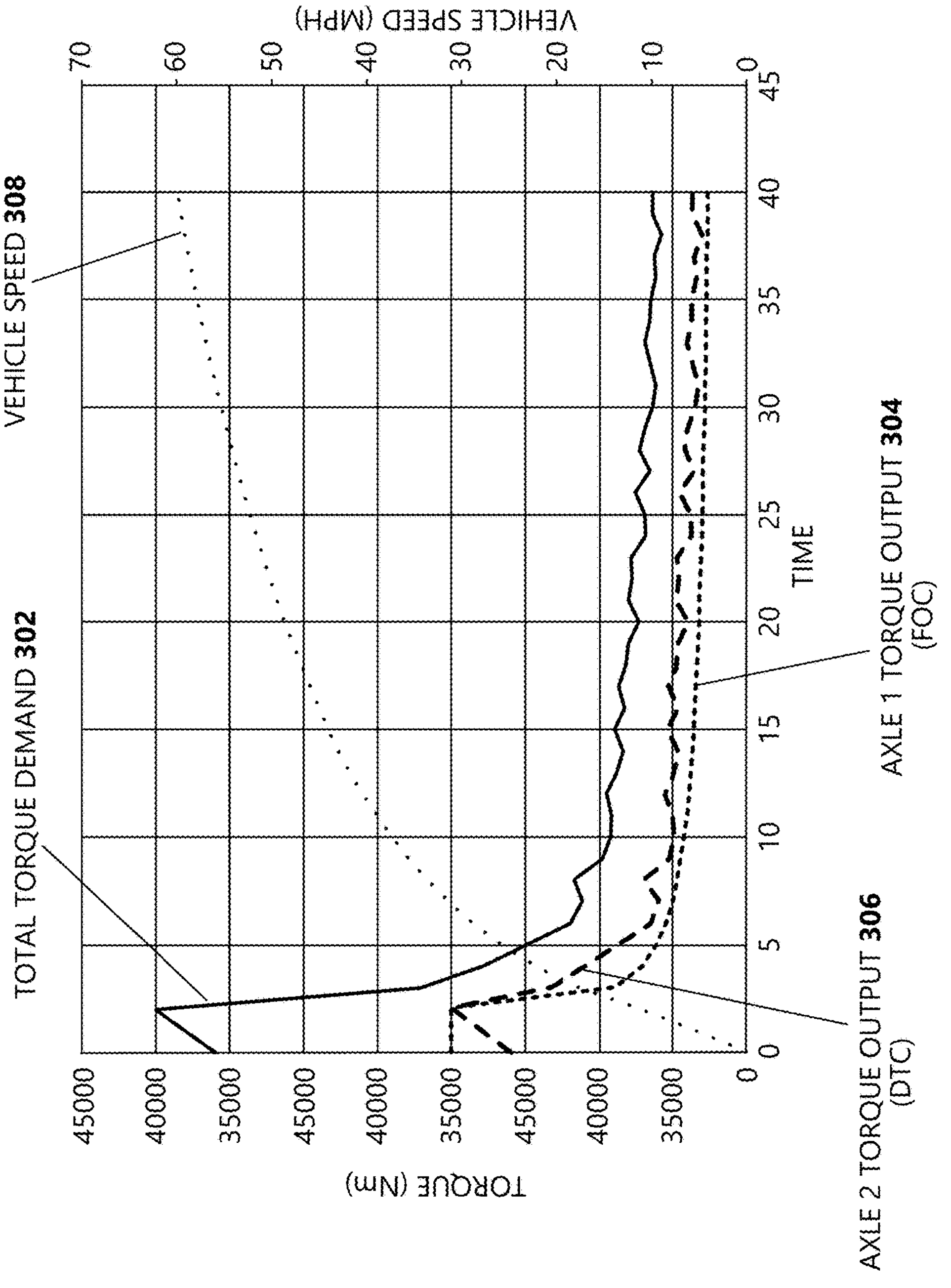
FIG. 3 is a graphical depiction of torque output of drive axles during operation of a first motor control mode according to examples.

An example graphical representation of the first motor control mode is depicted in FIG. 3. A total torque demand 302 is plotted as a solid line, where the total torque demand 302 may be calculated based on a translation of accelerator pedal requests and/or other signals. For example, sensor input associated with the powertrain system 115 of the vehicle 102 may indicate that vehicle operating conditions correspond to normal acceleration conditions. As represented in FIG. 3, in normal acceleration conditions, the total torque demand 302 may include various random fluctuations illustrative of fluctuations caused by accelerations and decelerations due to traffic, potholes, grade changes, pedestrians, and/or other factors.

The torque output 304 of the first drive axle 114*a* (depicted as a shorter-dashed line) is shown as having a smooth, fairly consistent output. For instance, torque commands 205 transmitted to the first drive axle 114*a* include torque references (corresponding to the first drive axle's determined torque distribution) generated by the second MCS subsystem 150 using FOC. Thus, the first drive axle's torque output 304 may be at or close to its peak efficiency point. As depicted, at low vehicle speeds 308, the torque output 304 of the first drive axle 114*a*, may be slightly higher than torque output 306 of the second drive axle 114*b* (depicted as a longer-dashed line). For instance, while FOC torque output 304 may start at 20,000 Nm at or near time=0 s, the torque output 306 of the second drive axle 114*b*, regulated by torque references generated using DTC, may start to build from time=0 s (e.g., due to low speed uncertainty in rotor position). The torque output 306 of the second drive axle 114*b* is shown as fluctuating corresponding to the dynamic fluctuations in the total torque demand 302. The fluctuations in the second drive axle's torque output 306 may be based on the difference between the total torque demand 302 and the torque output 304 of the first drive axle 114*a*. The second drive axle's torque output 306 may be associated with higher dynamic state efficiency and the first drive axle's torque output 304 may be associated with higher steady state efficiency. Thus, implementation of the first motor control mode provides optimized efficiency of the powertrain system 115 using a combination of MCSs during normal acceleration conditions.

Figure 4:
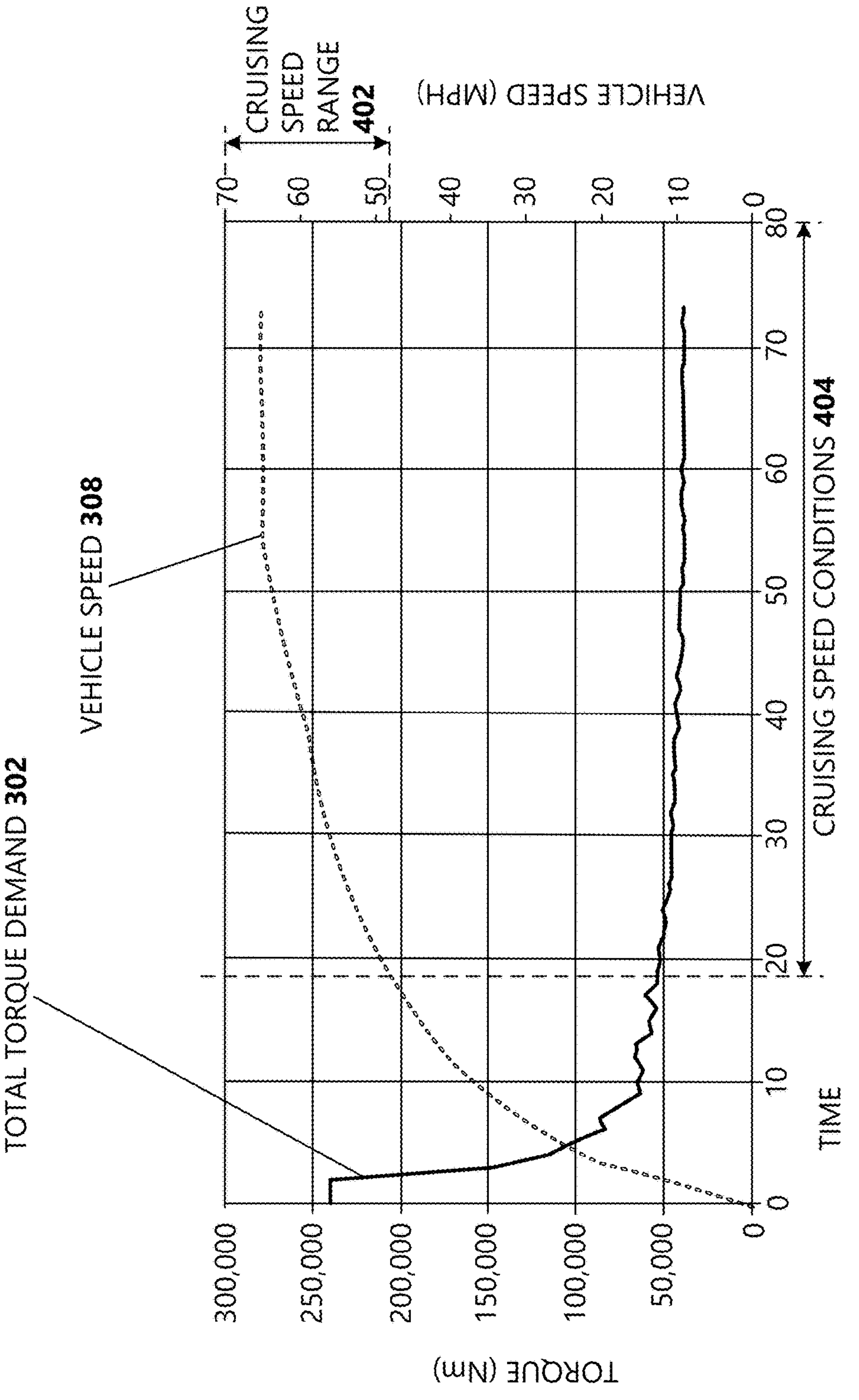
FIG. 4 is a graphical depiction of torque output of drive axles during operation of a second motor control mode according to examples.

An example graphical representation of operation of a second motor control mode is illustrated in FIG. 4. In some examples, a determination may be made that sensor input associated with the powertrain system 115 of the vehicle 102 indicate that vehicle operating conditions correspond to a second vehicle operating condition, such as cruising speed conditions 404. For instance, in cruising speed conditions 404, the vehicle speed 308 may be within a predefined cruising speed range 402. Based on a determination of cruising speed conditions 404, the MCS controller 110 may determine to implement the second motor control mode. In some implementations, "cruising speed" represents a range of specific vehicle speeds 308 at which the vehicle 102 is intended to operate efficiently and comfortably during sustained highway or open road driving conditions. The cruising speed range 402 may be defined based on factors such as engine power, torque characteristics, aerodynamics, fuel economy, and/or other considerations. For example, cruising speed conditions 404 may occur after normal or hard acceleration to the cruising speed range 402. In other examples, one or more other vehicle operating factors may be used to trigger the second motor control mode. In the second motor control mode, the powertrain controller 108 may use the second MCS subsystem 150 to generate torque references for both the first drive axle 114*a* and the second drive axle 114*b*. In examples, as the vehicle 102 reaches the cruising speed range 402, fluctuations in total torque demand 302 may be less severe. Accordingly, the drive axle(s) that are operating in DTC during normal or hard acceleration may be switched to FOC (e.g., the first drive axle 114*a* or the first and second drive axles 114*a* and 114*b*). For instance, FOC torque references may cause both the first drive axle 114*a* and the second drive axle 114*b* to operate at a high level of steady state efficiency during cruising speed conditions, where various vehicle operating conditions may be less dynamic.

In other examples, sensor input associated with the powertrain system 115 of the vehicle 102 indicates that vehicle operating conditions correspond to a third vehicle condition, such as above-normal (e.g., hard) acceleration conditions. For instance, accelerator pedal request signals may indicate a sudden or large increase in accelerator pedal position (e.g., over a threshold). This may indicate a driver's intention to accelerate quickly, such as when merging onto a highway, when performing a quick lane change, etc. In some examples, a hard acceleration condition may be further determined based on input from one or more other sensors 106, such as yaw rate, lateral acceleration, or wheel slip (e.g., to assess dynamic behavior of the vehicle 102). Sudden changes or aggressive maneuvers may indicate hard acceleration conditions. When hard acceleration conditions are determined, the MCS controller 110 may select to implement the third motor control mode. In the third motor control mode, the powertrain controller 108 may use the first MCS subsystem 125 to generate torque references using DTC for both the first drive axle 114*a* and the second drive axle 114*b*. In examples, DTC torque references may cause both the first drive axle 114*a* and the second drive axle 114*b* to provide an optimal dynamic response to meet increased (hard) acceleration demands. It should be appreciated that utilization of additional and/or alternative motor control modes and MCSs are possible and are within the scope of the present disclosure.

Figure 5:
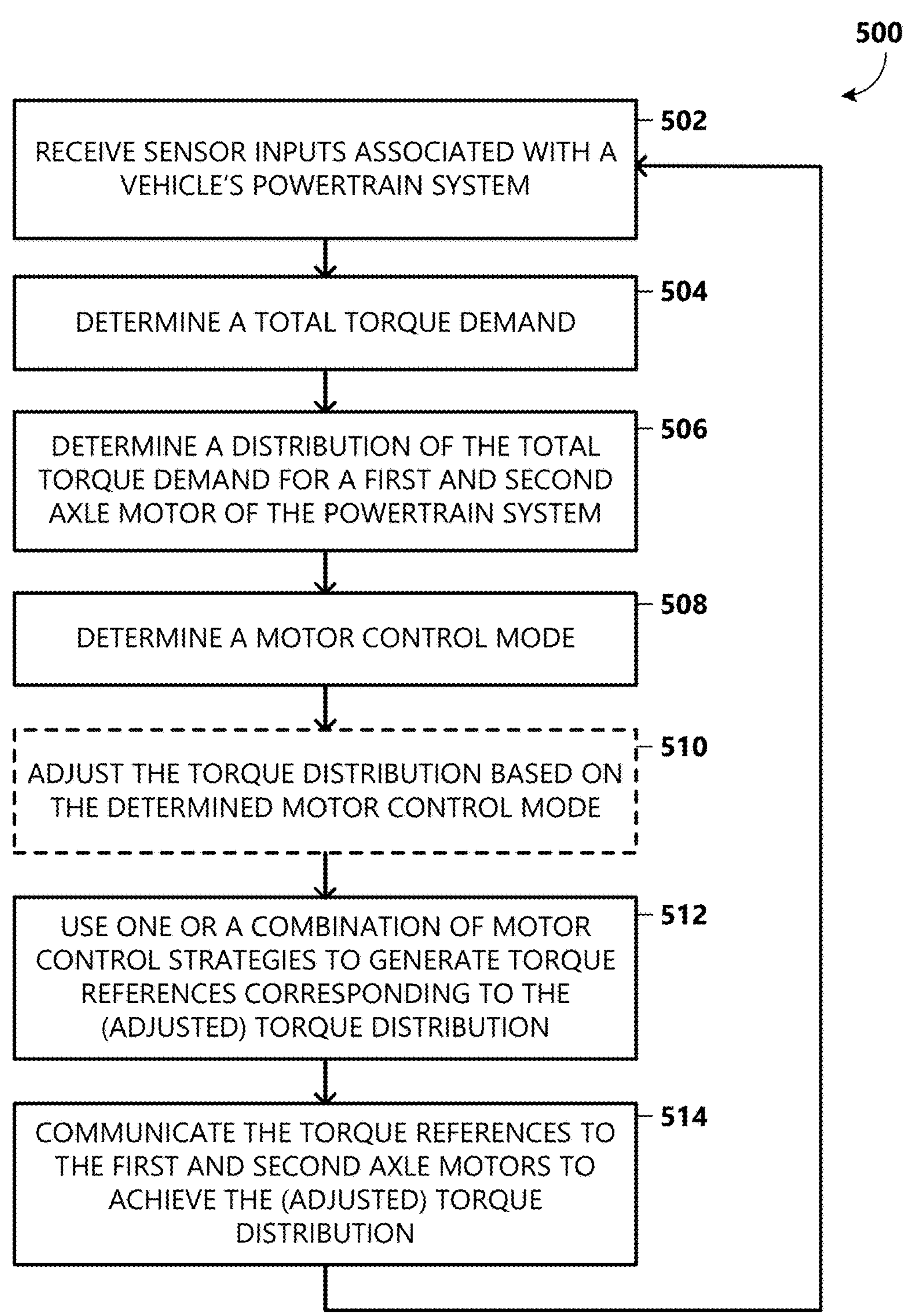
FIG. 5 is a flow diagram illustrating a method to provide dynamic motor control to increase powertrain efficiency according to examples.

FIG. 5 is a flow diagram illustrating an example method 500 for providing dynamic motor control to increase powertrain efficiency according to examples. At operation 502, various sensor inputs and signals associated with a vehicle's powertrain system 115 may be received. For instance, the powertrain controller 108 may receive inputs and signals corresponding to accelerator pedal position (e.g., the driver's torque demand) and other relevant parameters (e.g., vehicle speed, road conditions, available power sources) may represent vehicle operating conditions.

At operation 504, a total torque demand 302 to be delivered by the powertrain system 115 may be determined based on the received sensor inputs. For instance, the accelerator pedal position may be mapped to a torque demand and adjusted based on other inputs and signals.

At operation 506, a distribution of the total torque demand 302 may be determined. In some examples, the torque distribution between a first drive axle 114*a* and a second drive axle 114*b* may be generally equivalent. In other examples, the torque distribution between the first drive axle 114*a* and the second drive axle 114*b* may be adjusted based on various vehicle operating conditions. In further examples, the torque distribution between different sides of a drive axle 114 may be adjusted based on various vehicle operating conditions.

At operation 508, a determination may be made regarding a motor control mode to implement to generate torque references to produce the torque distribution between drive axle motors 202. For instance, the MCS controller 110 may determine whether vehicle operating conditions correspond to the first, second, or third motor control mode based on received inputs and signals. In some examples, a determination may be made to implement the first motor control mode when normal acceleration conditions are determined, where the first motor control mode may optimize powertrain efficiency under normal acceleration conditions. In other examples, a determination may be made to implement the second motor control mode when cruising speed conditions 404 are determined, where the second motor control mode may optimize powertrain efficiency under cruising speed conditions 404. In other examples, a determination may be made to implement the third motor control mode when above-normal (hard) acceleration conditions are determined, where the third motor control mode may optimize powertrain response under hard acceleration conditions. In other examples, other vehicle operating conditions may be observed and/or other motor control modes may be determined based on the vehicle operating conditions.

At optional operation 510, the torque distribution may be adjusted based on the determined motor control mode. For instance, when a determination is made to implement the first motor control mode, a torque distribution for an electric motor 202 of the first drive axle 114*a* may be adjusted to a torque value corresponding to its peak operating efficiency. Additionally, the torque distribution for an electric motor 202 of the second drive axle 114*b* may be adjusted to compensate for the difference between the total torque demand 302 and the torque distribution for a first drive axle 114*a*.

At operation 512, based on the determination of motor control mode, one or a combination of MCSs may be used to generate torque references for the drive axle motors 202. In an example implementation, the first motor control mode may involve using FOC for generating torque references corresponding to the determined first drive axle torque distribution. For instance, the second MCS subsystem 150 may use FOC to generate torque references for the first drive axle 114*a* that cause a first electric motor 202*a* to provide a power output that allows the first drive axle 114*a* to achieve the desired torque distribution/torque output. The first motor control mode may further include using the first MCS subsystem 125 to implement DTC to generate torque references for the second drive axle 114*b* that cause a second electric motor 202*b* to provide a power output that allows the second drive axle 114*b* to achieve the desired torque distribution/torque output. For instance, the FOC-derived torque references for the first drive axle 114*a* may allow for the first drive axle 114*a* to achieve high efficiency, and the DTC-derived toque references for the second drive axle 114*b* may allow for the second drive axle 114*b* to make up for the changing torque demand.

In another example, such as when a determination is made to implement the second motor control mode, FOC may be used to generate torque references for both the first drive axle 114*a* and the second drive axle 114*b*. For instance, the second MCS subsystem 150 may use FOC to generate torque references for the first drive axle 114*a* and torque references for the second drive axle 114*b* that cause the first 202*a* and second electric motors 202*b* to provide a power output that allows the first 114*a* and second drive axles 114*b* to achieve the desired distribution of the total torque demand 302. The FOC-derived torque references may allow the powertrain system 115 to achieve high efficiency, where, at cruising speeds where torque fluctuations may be less severe, both the first drive axle 114*a* and second drive axle 114*b* may operate near their peak operating efficiencies.

In still another example, when a determination is made to implement the third motor control mode, the powertrain controller 108 may implement DTC to generate torque references for both the first drive axle 114*a* and the second drive axle 114*b*. For instance, the first MCS subsystem 125 may use DTC to generate torque references for the first drive axle 114a and torque references for the second drive axle 114b that cause the first 202a and second electric motors 202b to provide a power output that allows the first 114a and second drive axles 114b to achieve the desired distribution of the total torque demand 302. The DTC-derived torque references may allow the powertrain system 115 to achieve optimal dynamic response under hard acceleration conditions.

At operation 514, torque commands including the generated torque references may be communicated to the first drive axle 114a and second drive axle 114b. The torque references may cause the first 202a and second electric motors 202b to provide a power output that allows the first 114a and second drive axles 114b to achieve the torque distributions and maximize powertrain efficiency.

Figure 6:
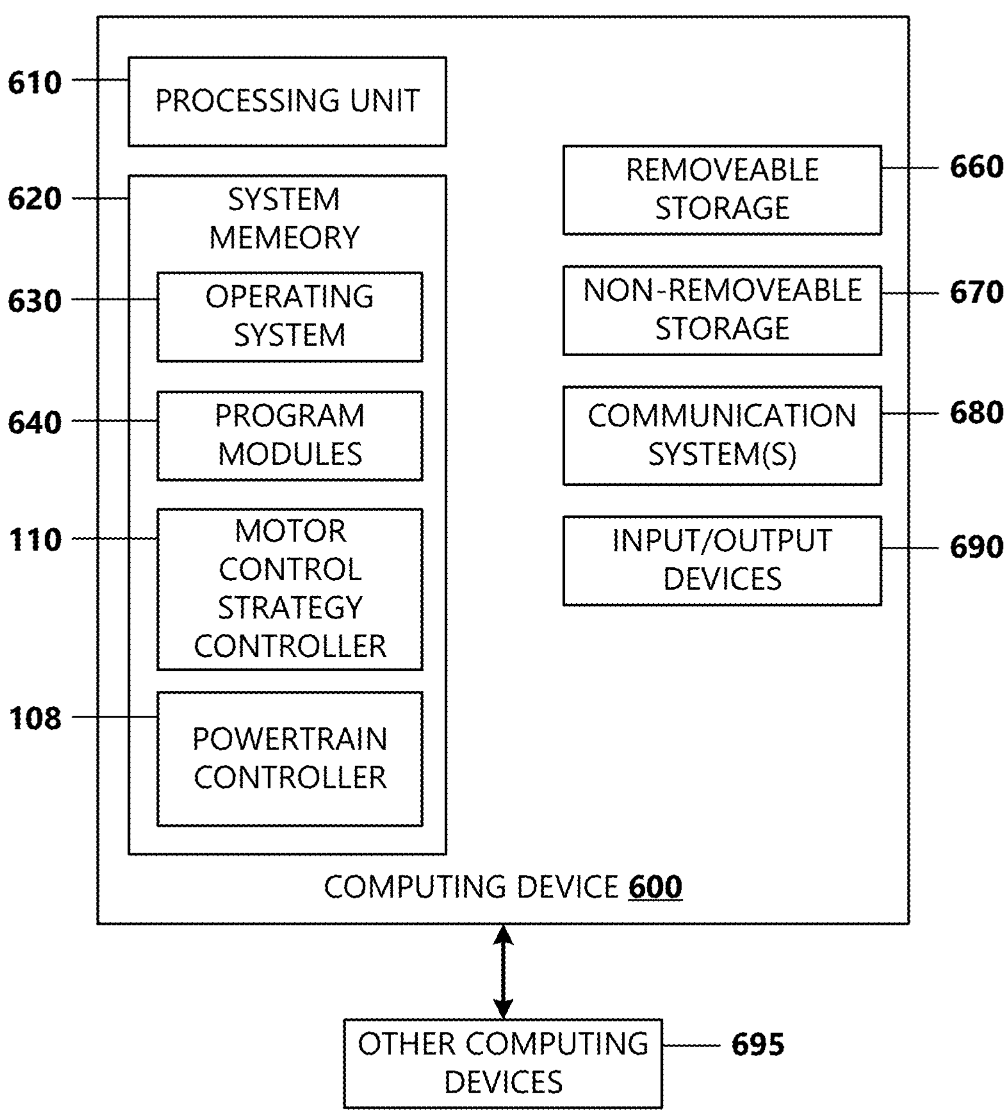
FIG. 6 is a block diagram illustrating example physical components of a computing device or system with which examples may be practiced.

FIG. 6 is a system diagram of a computing device 600 according to an example. As shown in FIG. 6, the physical components (e.g., hardware) of the computing device 600 are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640. The program modules 640 may be responsible for performing one more of the operations of the methods described above for providing robust network connectivity. A number of different program modules and data files may be stored in the system memory 620. While executing on the processing unit 610, the program modules 640 may perform the various processes described above. One example program module 640 includes sufficient computer-executable instructions for the MCS controller 110 and the powertrain controller 108.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695 such as, for example, routing engines, gateways, signings systems and the like. Examples of communication systems 680 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 600 may also have one or more input devices and/or one or more output devices shown as input/output devices 690. These input/output devices 690 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer storage media may be tangible and non-transitory and does not include a carrier wave or other propagated or modulated data signal.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

I claim:

1. A method for providing dynamic motor control of a vehicle, comprising:

determining a total torque demand to a powertrain system of a vehicle;

determining a torque distribution of the total torque demand between a first drive axle motor and a second drive axle motor of the powertrain system;

determining a motor control mode, wherein determining the motor control mode comprises determining a first motor control mode based on sensor input corresponding to first acceleration conditions, the first motor control mode comprising:

using Field Oriented Control (FOC) to generate first torque references for the first drive axle motor, and using Direct Torque Control (DTC) to generate second torque references for the second drive axle motor;

generating the first and second torque references for the first and second drive axle motors based on the determined torque distribution using a motor control strategy corresponding to the first motor control mode;

transmitting the first and second torque references to the first and second drive axle motors to achieve the determined torque distribution;

generating, by the first drive axle motor, first torque based at least in part on the first torque references; and generating, by the second drive axle motor, second torque based at least in part on the second torque references.

2. The method of claim 1, further comprising:

determining a peak efficiency point of the first drive axle motor; and adjusting the determined torque distribution so that a first distribution for the first drive axle motor corresponds to a peak efficiency point of the first drive axle motor and a second distribution for the second drive axle motor corresponds to a difference between the total torque demand and the first distribution.

3. The method of claim 1, further comprising determining a second motor control mode based on sensor input corresponding to second acceleration conditions, the second motor control mode comprising: using Field Oriented Control (FOC) to generate torque references for the first drive axle motor and the second drive axle motor.

4. The method of claim 1, further comprising determining a third motor control mode based on sensor input corresponding to third acceleration conditions, the third motor control mode comprising: using Direct Torque Control (DTC) to generate torque references for the first drive axle motor and the second drive axle motor.

5. A system for providing dynamic motor control of a vehicle, comprising:

at least one processor; and memory storing instructions that, when executed by the processor, cause the system to:

receive sensor input associated with a powertrain system of the vehicle;

determine a total torque demand based on the sensor input;

determine a torque distribution of the total torque demand between a first drive axle motor and a second drive axle motor of the powertrain system based on the sensor input;

determine a motor control mode based on the sensor input, wherein determining the motor control mode comprises determining a first motor control mode based on sensor input corresponding to first acceleration conditions, the first motor control mode comprising:

using Field Oriented Control (FOC) to generate first torque references for the first drive axle motor, and using Direct Torque Control (DTC) to generate second torque references for the second drive axle motor;

generate the first and second torque references for the first and second drive axle motors based on the determined torque distribution using a motor control strategy corresponding to the first motor control mode;

transmit the first and second torque references to the first and second drive axle motors to achieve the determined torque distribution;

generate, by the first drive axle motor, first torque based at least in part on the first torque references; and generate, by the second drive axle motor, second torque based at least in part on the second torque references.

6. The system of claim 5, wherein:

the distribution of the total torque demand for the first drive axle motor corresponds to a peak efficiency point of the first drive axle motor; and the distribution of the total torque demand for the second drive axle motor corresponds to a difference between the total torque demand and the distribution for the first drive axle motor.

7. The system of claim 5, further comprising determining a second motor control mode of a plurality of motor control modes and where the second motor control mode:

corresponds to second acceleration conditions; and generates torque references for the first drive axle motor and the second drive axle motor using FOC.

8. The system of claim 5, further comprising determining a third motor control mode of a plurality of motor control modes and where the third motor control mode:

corresponds to third acceleration conditions; and generates torque references for the first drive axle motor and the second drive axle motor using DTC.

9. A powertrain controller for a vehicle including a drive axle, comprising:

at least one processor; and memory storing instructions that, when executed by the at least one processor, cause the powertrain controller to:

receive sensor input associated with a powertrain system of the vehicle;

determine a total torque demand based on the sensor input;

determine a torque distribution of the total torque demand between a first drive axle motor and a second drive axle motor of the powertrain system based on the sensor input;

determine a motor control mode of a plurality of motor control modes based on the sensor input, where each motor control mode corresponds to using one or a combination of motor control strategies, herein determining the motor control mode comprises determining a first motor control mode based on sensor input corresponding to first acceleration conditions, the first motor control mode comprising:

using Field Oriented Control (FOC) to generate first torque references for the first drive axle motor, and using Direct Torque Control (DTC) to generate second torque references for the second drive axle motor;

generate the first and second torque references for the first and second drive axle motors based on the determined torque distribution using the one or a combination of motor control strategies corresponding to the determined motor control mode;

transmit the torque references to the first and second drive axle motors to achieve the determined torque distribution;

generate, by the first drive axle motor, first torque based at least in part on the first torque references; and generate, by the second drive axle motor, second torque based at least in part on the second torque references.

10. The powertrain controller of claim 9, wherein the first motor control mode includes:

determining a peak efficiency point of the first drive axle motor; and adjusting the determined torque distribution so that a first torque distribution for the first drive axle motor corresponds to a peak efficiency point of the first drive axle motor and a second torque distribution for the second drive axle motor corresponds to a difference between the total torque demand and the first distribution.

11. The powertrain controller of claim 9, further comprising determining a second motor control mode of the plurality of motor control modes, the second motor control mode corresponding to second acceleration conditions and includes using Field Oriented Control (FOC) to generate torque references for the first drive axle motor and the second drive axle motor.

12. The powertrain controller of claim 9, further comprising determining a third motor control mode of the plurality of motor control modes, the third motor control mode corresponding to third acceleration conditions and includes using Direct Torque Control (DTC) to generate torque references for the first drive axle motor and the second drive axle motor.

* * * * *